INVENTORS
LUDWIG KRAUS AND
JOSEF GNAMBS

BY Dieke and Craig
ATTORNEYS.

Dec. 25, 1956     L. KRAUS ET AL     2,775,467
WHEEL SUSPENSION FOR MOTOR VEHICLES
Filed May 24, 1955     2 Sheets-Sheet 2
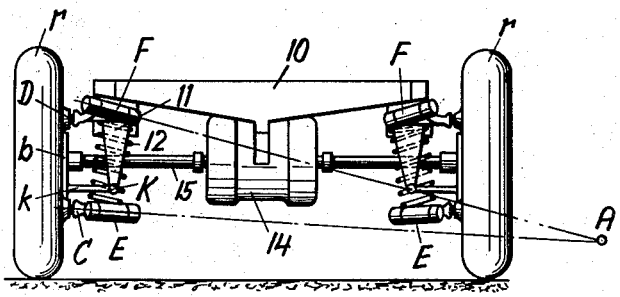
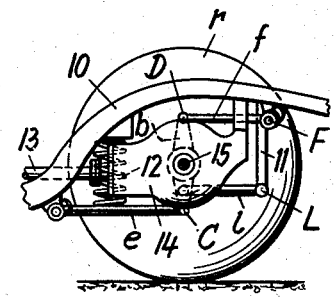
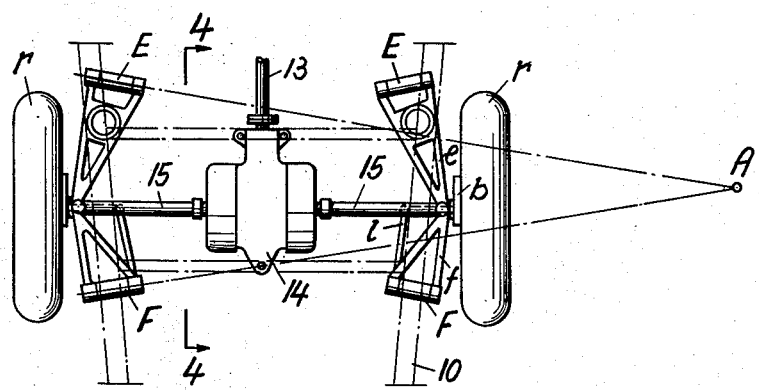
INVENTORS
LUDWIG KRAUS AND
JOSEF GNAMBS
BY *Dixie and Craig*
ATTORNEYS.

United States Patent Office 2,775,467
Patented Dec. 25, 1956

2,775,467
WHEEL SUSPENSION FOR MOTOR VEHICLES

Ludwig Kraus, Stuttgart-Unterturkheim, and Josef Gnambs, Stuttgart-Wangen, Germany, assignors to Daimler-Benz Aktiengesellschaft, Stuttgart-Unterturkheim, Germany Application May 24, 1955, Serial No. 510,725

Claims priority, application Germany May 24, 1954

5 Claims. (Cl. 280—124)

The present invention relates to a wheel suspension, particularly for motor vehicles.

It is an object of the present invention to provide a wheel suspension which has the characteristics and advantages of a wheel suspension for oscillating half-axles but eliminates the requirement for such half-axles.

Another object of the present invention is to provide a wheel suspension of great simplicity which, however, takes up the forces acting on the wheels more fully and properly than many much more complicated constructions and as closely as possible to the planes of the wheels and with very little variation of the caster angle of the wheels in resilient movement thereof.

An essential feature of the invention consists in mounting the wheel carrier of each wheel by means of two thrust-arms which are disposed at different levels and extend substantially in the longitudinal direction of the vehicle. These thrust arms are adapted to swing about two axes which converge toward each other with their point of intersection or at least their approximate point of intersection lying within a direction toward the opposite wheel. The thrust arms are preferably pivotally mounted on the vehicle body at opposite sides of the wheel carrier, that is, as seen from the wheel carrier, so as to extend in opposite directions.

According to another feature of the invention it is possible to provide the virtual fulcrum of the oscillating half-axles, i. e. the point of intersection of the oscillating axes of the thrust arms, at a suitable distance from the respective wheel, for example, outside of the opposite wheel, and to make the virtual length of the half-axles of any desired length. Such virtual fulcrum may also be disposed at a point lower than the rotary axis of the wheel.

Further objects, features, and advantages of the present invention will be apparent from the following detailed description of two preferred embodiments of the invention and the accompanying drawings thereof, in which Fig. 1 shows a diagrammatic perspective illustration of a wheel suspension having two thrust arms of equal length which are pivotable about inclined axes;

Fig. 4 is a cross section taken along line 4—4 of Fig. 6 and shows the details of construction of an embodiment of the invention similar to Figs. 2 and 3;

Fig. 5 is a front view of the embodiment shown in Fig. 6; while Fig. 6 is a top view thereof.

Figure 1:
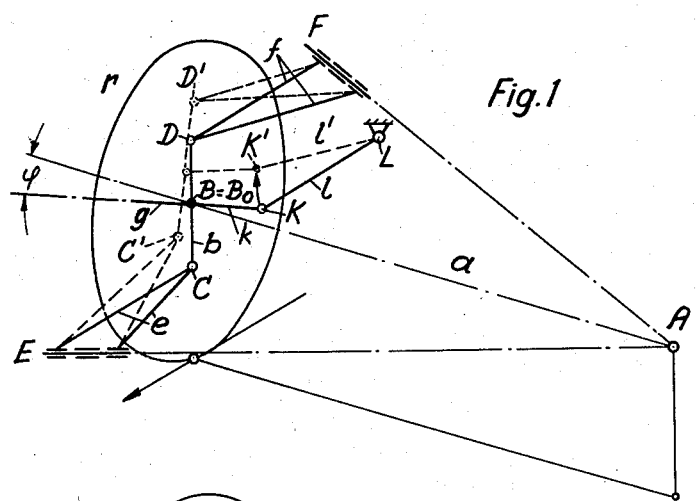

Referring to the drawings, the wheel $r$ is mounted on the journal $g$ of the wheel carrier $b$, and the journal $g$ may be disposed, for example, at the center B of the wheel carrier $b$. The latter is supported and guided by the two thrust arms $e$ and $f$ which extend substantially in the longitudinal direction of the vehicle. Thrust arms $e$ and $f$ each form a triangle and are mounted, on the one hand, on the wheel carrier $b$ by means of universal or ball-and-socket joints C, D, and on the other hand, on the vehicle body.

The pivotal axes or axes of oscillation of the thrust arms $e$ and $f$ facing the frame or body of the vehicle are determined by the lines A—E or A—F, respectively, wherein A constitutes the point of intersection of the two pivotal axes and forms the virtual fulcrum of an imaginary oscillating half-axle $a=A-B_0$ at the vehicle body which is determined by the thrust arms. Since the arms $e$ and $f$ in Fig. 1 are of equal length, the point $B_0$ lies at the center B intermediate C and D.

In order to safeguard the wheel against turning out of the driving direction, wheel carrier $b$ is provided with a crank arm $k$, at the end of which the supporting arm $l$ is mounted by means of a ball-and-socket joint K or the like. Supporting arm $l$ is, in turn, connected to the vehicle frame by means of the joint L. Thus, when the wheel oscillates in a substantially vertical direction, the wheel carrier $b$ will be supported, on the one hand, by the triangular arms $e$ and $f$, for example, by the joint C moving to the point C' and the joint D to the point D', and, on the other hand, by the arm $l$ which, in the raised position of the wheel assumes, for example, the position $l'$. The wheel carrier $b$ then carries out a rotary movement about the axis A—B.

Figure 2:
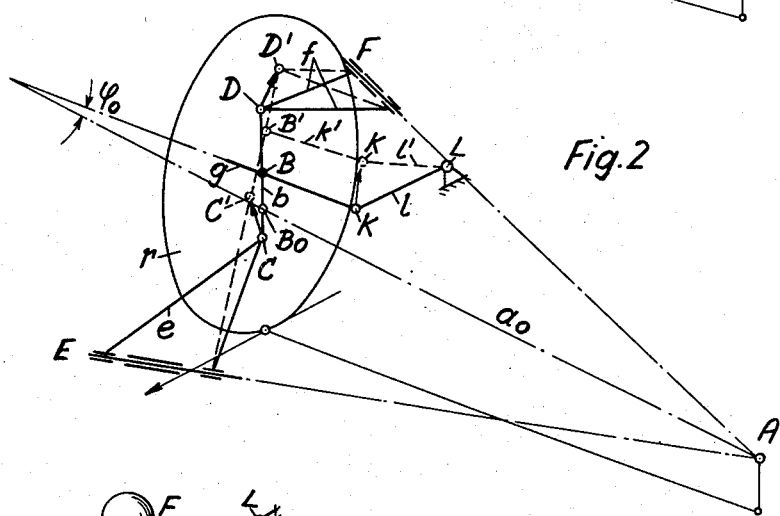
Fig. 2 shows a similar illustration of a wheel suspension having two thrust arms of different length.
Figure 3:
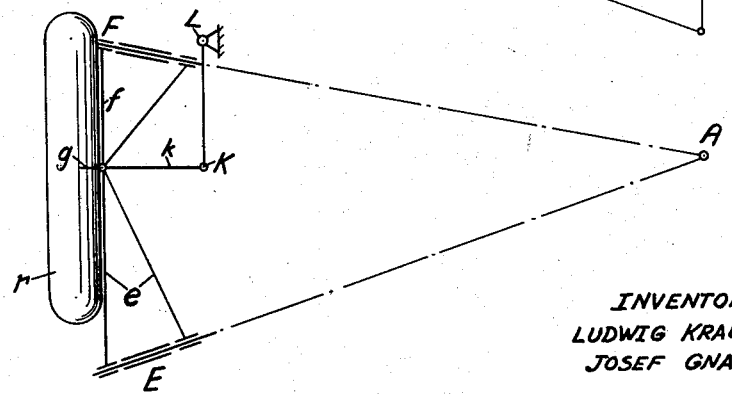
Fig. 3 is a plan view of the wheel suspension shown in Fig. 2.

Since the joint K then moves within an arc about the joint L toward the point K', it is advisable in accordance with Figs. 2 and 3, to make the arms $e$ and $f$ of different lengths so that point B of the wheel will describe a similar arc as the joint K so that crank arm $k$ carries out a parallel movement. The provision of such thrust arms of unequal length has the additional advantages as subsequently described.

Since at a lower point of intersection A as shown in Fig. 1, the journal $g$ forms an angle $\varphi$ relative to the rotary axis $A-B=a$ of the wheel carrier, it carries out a conical movement about the extended axis A—B when the wheel oscillates and thus exerts a guiding or steering action upon the wheel. The larger the angle $\varphi$ is between the journal $g$ and the rotary axis A—B, the larger will be the deflection. By shortening the upper arm $f$, however, the fulcrum $B_0$, about which the wheel carrier $b$ turns when oscillating, will be shifted downwardly, as shown, for example, in Fig. 2, so that the rotary axis will assume the position $a_0$, while the deflection of the wheel will be reduced in accordance with the smaller angle $\varphi_0$.

Since the virtual fulcrum A may be placed at any desired point remote from the wheel, the further possibility will result that the change in alignment may be reduced to any desired minimum values. Such virtual fulcrum A may, if desired, also be placed at a higher point, without incurring any disadvantages, that is, for example, at or even above the wheel center, since at a considerable length of the oscillating axle a lateral moment of force which might be of disadvantage will not occur.

The supporting arm $l$ may, if desired, also be provided and arranged for maintaining the alignment of the wheel, for example, if the arms $e$ and $f$ are made of equal length, so that when the wheel is running under a load, it will be guided as straight as possible and the small deflections which cannot be avoided will occur only when the wheel is running without a load so that any disturbing forces will be practically excluded.

Because of the longer pendulum arm it is also possible to maintain the longitudinal displacement of the drive shafts between the axle transmission and driven wheels within small limits. This reduces the wear and facilitates the lubrication, and the universal joints of the drive shafts may be more easily manufactured.

A particular constructive embodiment of the invention as illustrated in Figs. 2 and 3 is shown in Figs. 4 to 6, wherein similar reference characters are applied to corresponding parts.

The thrust arms e and f are pivotally mounted at the points E and F on the frame 10 so that the axes of the joints E and F intersect at a point A which lies outside of the opposite wheel r. The arm l which is designed to take up the torque acting about a vertical axis is supported by a bracket 11 on the frame 10, but may also be mounted in any other suitable manner. Also, in place of an arm which extends parallel with the thrust arm f, an arm may be provided which extends parallel with the thrust arm e. The lower, longer arm e extends as seen from the wheel carrier b, toward the rear. If the brakes are mounted on the wheel, this will result in the advantage that the braking moments acting upon the wheel exert tensile stresses upon the arms e and f. The wheels are resiliently mounted by means of coil springs 12 which, on the one hand, act upon the lower arm e and, on the other hand, upon the frame 10.

The axle has been illustrated as being a driven axle. The wheels r may be driven, for example, by an engine mounted in the front of the vehicle through a drive shaft 13, a transmission 14, and lateral pivotal shafts 15 which connect the transmission 14 with the journal mounted on the wheel carrier b.

Although our invention has been illustrated and described with reference to the preferred embodiments thereof we wish to have it understood that it is in no way limited to the details of such embodiments or to the specific examples described, but is capable of numerous modifications within the scope of the appended claims.

Having thus fully disclosed our invention, what we claim is:

1. A wheel suspension for vehicles comprising a vehicle body, a wheel on one side of said vehicle, a wheel carrier, an upper thrust arm, a lower thrust arm, articulated means for mounting one end of the upper thrust arm on the wheel carrier, articulated means for mounting one end of the lower thrust arm on the wheel carrier, articulated means for mounting the other end of said upper thrust arm on the vehicle body, articulated means for mounting the other end of said lower thrust arm on the vehicle body, said two last-mentioned means determining axes of oscillation of said thrust arms relative to said vehicle body which converge toward the side of the vehicle opposite to the said wheel, and the point of intersection of said axes of oscillation lying beyond the wheel of the opposite side of the vehicle with respect to the longitudinal vertical central plane of the vehicle.

2. A wheel suspension as defined in claim 1, wherein said axes of oscillation extend in a direction so as to intersect at a point lower than the central axis of said wheel.

3. A wheel suspension as defined in claim 1, wherein said thrust arms extend in a longitudinal direction of said vehicle from said wheel carrier toward opposite directions.

4. A wheel suspension as defined in claim 1, wherein said two first-mentioned articulated means comprise universal joints, and means for supporting said wheel carrier on said vehicle body so as to prevent turning of the wheel carrier about a vertical axis extending through said two first-mentioned articulated means.

5. A wheel suspension as defined in claim 4, wherein said last-mentioned supporting means comprises an arm on said wheel carrier and extending from said vertical axis, a thrust arm extending substantially perpendicularly to said arm, means for pivotally mounting said last thrust arm on said wheel carrier, and means for pivotally mounting said last thrust arm on said vehicle body.

References Cited in the file of this patent

UNITED STATES PATENTS

| | | |
|---|---|---|
| 1,970,823 | Suczek | Aug. 21, 1934 |
| 2,330,633 | Seyerle | Sept. 28, 1943 |